United States Patent
Subramanian et al.

(10) Patent No.: US 9,634,364 B2
(45) Date of Patent: Apr. 25, 2017

(54) SUPPORT STRUCTURE FOR TRACTION BATTERY ASSEMBLY WITH INTEGRATED THERMAL PLATE

(71) Applicant: FORD GLOBAL TECHNOLOGIES, LLC, Dearborn, MI (US)

(72) Inventors: Rajaram Subramanian, Ann Arbor, MI (US); Patrick Daniel Maguire, Ann Arbor, MI (US); Tommy M. Gunther, Canton, MI (US); Keith Kearney, Grosse Ile, MI (US); Stuart Schreiber, Inkster, MI (US); John Jardine, Harrison Twp., MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 257 days.

(21) Appl. No.: 14/525,266

(22) Filed: Oct. 28, 2014

(65) Prior Publication Data

US 2016/0118701 A1    Apr. 28, 2016

(51) Int. Cl.

| H01M 10/6555 | (2014.01) |
| H01M 10/6554 | (2014.01) |
| H01M 10/625 | (2014.01) |
| H01M 2/10 | (2006.01) |
| H01M 10/04 | (2006.01) |
| H01M 10/615 | (2014.01) |
| H01M 10/6557 | (2014.01) |

(Continued)

(52) U.S. Cl.
CPC ..... *H01M 10/6554* (2015.04); *H01M 2/1077* (2013.01); *H01M 10/0481* (2013.01); *H01M 10/613* (2015.04); *H01M 10/615* (2015.04); *H01M 10/625* (2015.04); *H01M 10/6557* (2015.04); *H01M 10/425* (2013.01); *H01M 10/647* (2015.04); *H01M 10/667* (2015.04); *H01M 2220/20* (2013.01)

(58) Field of Classification Search
None
See application file for complete search history.

(56) References Cited

U.S. PATENT DOCUMENTS

| 2013/0164577 A1 | 6/2013 | Insana et al. |
| 2013/0252058 A1 | 9/2013 | Kim |

(Continued)

FOREIGN PATENT DOCUMENTS

| FR | 2986190 A1 * | 8/2013 | ............... B60K 1/04 |
| WO | 2013186020 A1 | 12/2013 | |

*Primary Examiner* — Lucas J O'Donnell
(74) *Attorney, Agent, or Firm* — David B. Kelley; Brooks Kushman P.C.

(57) ABSTRACT

A vehicle including a pair of spaced apart battery cell arrays, a pair of sub-structures configured to retain the arrays, and a thermal plate assembly disposed between the arrays is provided. Each of the sub-structures may include opposing endplates and opposing upper and lower sidewalls secured to the endplates and each having a flange extending toward and overlapping with the respective flange of the other sub-structure to join the sub-structures without mechanical fastening. The thermal plate assembly may be disposed between the overlapping flanges and the arrays to form a sandwich formation. The thermal plate assembly may include at least one thermal interface component disposed on a side of a thermal plate, and in contact with a portion of at least one of the battery cell arrays.

20 Claims, 5 Drawing Sheets

(51) Int. Cl.
*H01M 10/613* (2014.01)
*H01M 10/42* (2006.01)
*H01M 10/647* (2014.01)
*H01M 10/667* (2014.01)

(56) References Cited

U.S. PATENT DOCUMENTS

2014/0030566 A1    1/2014  Lee
2014/0162105 A1*   6/2014  Klausmann ......... H01M 2/1077
                                             429/120
2014/0220396 A1    8/2014  Lee et al.
2015/0249238 A1*   9/2015  Andre ................ B60K 1/04
                                             429/99

* cited by examiner

SUPPORT STRUCTURE FOR TRACTION BATTERY ASSEMBLY WITH INTEGRATED THERMAL PLATE

TECHNICAL FIELD

This disclosure relates to support structures for high voltage batteries and thermal management systems utilized in electrified vehicles.

BACKGROUND

Vehicles such as battery-electric vehicles (BEVs), plug-in hybrid-electric vehicles (PHEVs), mild hybrid-electric vehicles (MHEVs), or full hybrid-electric vehicles (FHEVs) contain an energy storage device, such as a high voltage (HV) battery, to act as a propulsion source for the vehicle. The HV battery may include components and systems to assist in managing vehicle performance and operations. The HV battery may include one or more arrays of battery cells interconnected electrically between battery cell terminals and interconnector busbars. The HV battery and surrounding environment may include a thermal management system to assist in managing temperature of the HV battery components, systems, and individual battery cells.

SUMMARY

A vehicle includes a pair of spaced apart battery cell arrays, a pair of sub-structures configured to retain the arrays, and a thermal plate assembly disposed between the arrays. Each of the sub-structures include opposing endplates and opposing upper and lower sidewalls secured to the endplates and each having a flange extending toward and overlapping with the respective flange of the other sub-structure to join the sub-structures without mechanical fastening. The thermal plate assembly is disposed between the overlapping flanges and the arrays to form a sandwich formation. The thermal plate assembly may include at least one thermal interface component disposed on a side of a thermal plate, and in contact with a portion of at least one of the battery cell arrays. The thermal plate assembly may further include one or more compression limiters arranged with at least one of the thermal interface components to dictate an amount of compression the at least one of the thermal interface component receives from the adjacent battery cell array. The upper and lower sidewalls may further include another flange covering at least a portion of respective outer faces defined by the battery cell arrays, respectively, and the another flanges may be arranged with the battery cell arrays such that opposing lateral forces are applied to the thermal plate assembly. The one of the overlapping flanges may define a width equal to or less than a width of the thermal plate assembly. The overlapping flanges may be laser welded, bolted, riveted, or adhesively bonded to one another.

A traction battery assembly includes first and second arrays of battery cells, an exo-support structure, and a thermal plate assembly. The first and second arrays of battery cells each having inner and outer faces and terminals extending from the outer faces. The exo-support structure includes retention flanges arranged to retain the arrays such that the flanges and inner faces define a cavity therebetween. The thermal plate assembly is disposed within the cavity, in thermal communication with the arrays, and arranged with the arrays to define a sandwich formation. The exo-support structure may include a pair of sub-structures on opposite sides of the thermal plate assembly. Each sub-structure may include upper and lower sidewalls having inner retention flanges of the retention flanges overlapping the respective upper or lower sidewall from the other sub-structure. The inner retention flanges may be arranged with the thermal plate assembly to exert opposing vertical forces against the thermal plate assembly. The upper and lower sidewalls may further include outer retention flanges of the retention flanges covering at least a portion of the outer faces of the arrays, and the outer retention flanges may be arranged with the arrays to exert opposing lateral forces against the thermal plate assembly. The exo-support structure may further include a center bar extending longitudinally along the outer faces to longitudinally reinforce the exo-support structure. The thermal plate assembly may include a pair of thermal interface components, one of each disposed on either side of a thermal plate. One or more compression limiters may be located on each side of the thermal plate facing the arrays. The limiters may be arranged with the battery cells to define an extent of the compression of the thermal interface components. The exo-support structure may include a pair of sub-structures on either side of the thermal plate assembly joined to one another without mechanical fasteners. Each sub-structure may include a plurality of vertical and lateral retention flanges of the retention flanges extending therefrom. The thermal plate assembly may include a thermal plate and a thermal interface component disposed on both sides of the plate, and the vertical and lateral retention flanges may be arranged with the arrays and thermal plate assembly such that opposing forces are exerted toward the thermal plate to compress the thermal interface components between the thermal plate and respective array.

A traction battery assembly includes first and second arrays of battery cells, a thermal plate assembly, and an exo-support structure. The first and second arrays of battery cells have terminals extending from outer side faces of the arrays. The thermal plate assembly is disposed between the arrays and in thermal communication therewith. The exo-support structure is configured to support the arrays and includes a pair of upper and lower sidewalls and pairs of opposing endplates. The pair of upper sidewalls each includes an upper flange extending above the thermal plate assembly and overlapping one another. The pair of lower sidewalls each includes a lower flange extending below the thermal plate assembly and overlapping one another. The pairs of opposing endplates are arranged with the respective sidewalls to retain the arrays therebetween. The flanges are arranged with the thermal plate assembly such that the arrays are compressed against the opposite sides of the thermal plate assembly. The thermal plate assembly may also include a thermal plate and a pair of thermal interface components disposed on opposite sides of the thermal plate and arranged with the exo-support structure to contact inner faces of the arrays. The thermal plate assembly may further include one or more compression limiters located proximate the thermal interface components and arranged with the exo-support structure to dictate an amount of compression force applied from the arrays to the thermal interface components. Each of the sidewalls may further include outer flanges covering at least a portion of the respective outer side faces, and the outer flanges may be arranged with the thermal plate assembly such that the arrays are compressed therebetween. One of each of the overlapping upper and lower flanges may define a width equal to or less than a width of the thermal plate assembly. The overlapping upper and lower flanges may be laser welded, bolted, or riveted to one another.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ embodiments of the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
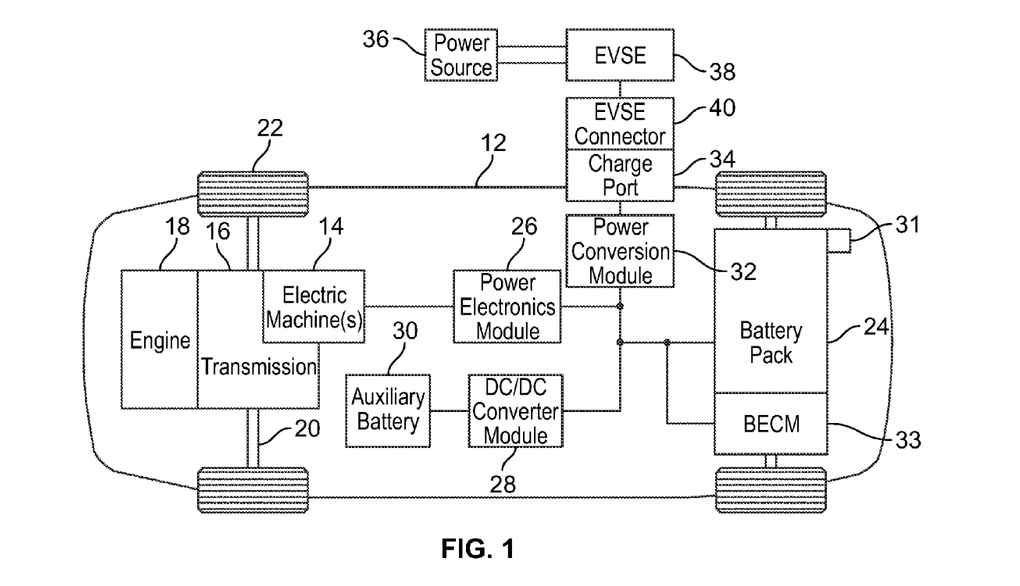
FIG. 1 is a schematic illustrating a battery electric vehicle.

FIG. 1 depicts a schematic of a typical plug-in hybrid-electric vehicle (PHEV). A typical plug-in hybrid-electric vehicle 12 may comprise one or more electric machines 14 mechanically connected to a hybrid transmission 16. The electric machines 14 may be capable of operating as a motor or a generator. In addition, the hybrid transmission 16 is mechanically connected to an engine 18. The hybrid transmission 16 is also mechanically connected to a drive shaft 20 that is mechanically connected to the wheels 22. The electric machines 14 can provide propulsion and deceleration capability when the engine 18 is turned on or off. The electric machines 14 also act as generators and can provide fuel economy benefits by recovering energy that would normally be lost as heat in the friction braking system. The electric machines 14 may also provide reduced pollutant emissions since the hybrid-electric vehicle 12 may be operated in electric mode or hybrid mode under certain conditions to reduce overall fuel consumption of the vehicle 12.

A traction battery or battery pack 24 stores and provides energy that can be used by the electric machines 14. The traction battery 24 typically provides a high voltage DC output from one or more battery cell arrays, sometimes referred to as battery cell stacks, within the traction battery 24. The battery cell arrays may include one or more battery cells. The traction battery 24 is electrically connected to one or more power electronics modules 26 through one or more contactors (not shown). The one or more contactors isolate the traction battery 24 from other components when opened and connect the traction battery 24 to other components when closed. The power electronics module 26 is also electrically connected to the electric machines 14 and provides the ability to bi-directionally transfer electrical energy between the traction battery 24 and the electric machines 14. For example, a typical traction battery 24 may provide a DC voltage while the electric machines 14 may require a three-phase AC voltage to function. The power electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24. The description herein is equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle loads. Other high-voltage loads, such as compressors and electric heaters, may be connected directly to the high-voltage without the use of a DC/DC converter module 28. In a typical vehicle, the low-voltage systems are electrically connected to an auxiliary battery 30 (e.g., 12 V battery).

A battery electrical control module (BECM) 33 may be in communication with the traction battery 24. The BECM 33 may act as a controller for the traction battery 24 and may also include an electronic monitoring system that manages temperature and charge state of each of the battery cells. The traction battery 24 may have a temperature sensor 31 such as a thermistor or other temperature gauge. The temperature sensor 31 may be in communication with the BECM 33 to provide temperature data regarding the traction battery 24. The temperature sensor 31 may also be located on or near the battery cells within the traction battery 24. It is also contemplated that more than one temperature sensor 31 may be used to monitor temperature of the battery cells.

The vehicle 12 may be, for example, an electric vehicle such as a PHEV, a FHEV, a MHEV, or a BEV in which the traction battery 24 may be recharged by an external power source 36. The external power source 36 may be a connection to an electrical outlet. The external power source 36 may be electrically connected to electric vehicle supply equipment (EVSE) 38. The EVSE 38 may provide circuitry and controls to regulate and manage the transfer of electrical energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34.

The various components discussed may have one or more associated controllers to control and monitor the operation of the components. The controllers may communicate via a serial bus (e.g., Controller Area Network (CAN)) or via discrete conductors.

The battery cells, such as a prismatic cell, may include electrochemical cells that convert stored chemical energy to electrical energy. Prismatic cells may include a housing, a positive electrode (cathode) and a negative electrode (anode). An electrolyte may allow ions to move between the anode and cathode during discharge, and then return during recharge. Terminals may allow current to flow out of the cell for use by the vehicle. When positioned in an array with multiple battery cells, the terminals of each battery cell may be aligned with opposing terminals (positive and negative) adjacent to one another and a busbar may assist in facilitating a series connection between the multiple battery cells. The battery cells may also be arranged in parallel such that similar terminals (positive and positive or negative and negative) are adjacent to one another. For example, two battery cells may be arranged with positive terminals adjacent to one another, and the next two cells may be arranged with negative terminals adjacent to one another. In this example, the busbar may contact terminals of all four cells.

The traction battery 24 may be heated and/or cooled using a liquid thermal management system, an air thermal management system, or other method as known in the art. In one example of a liquid thermal management system and now referring to FIG. 2, the traction battery 24 may include a battery cell array 88 shown supported by a thermal plate 90 to be heated and/or cooled by a thermal management system. The battery cell array 88 may include a plurality of battery cells 92 positioned adjacent to one another and structural components. The DC/DC converter module 28 and/or the BECM 33 may also require cooling and/or heating under certain operating conditions. A thermal plate 91 may support the DC/DC converter module 28 and BECM 33 and assist in thermal management thereof. For example, the DC/DC converter module 28 may generate heat during voltage conversion which may need to be dissipated. Alternatively, thermal plates 90 and 91 may be in fluid communication with one another to share a common fluid inlet port and common outlet port.

Figure 2:
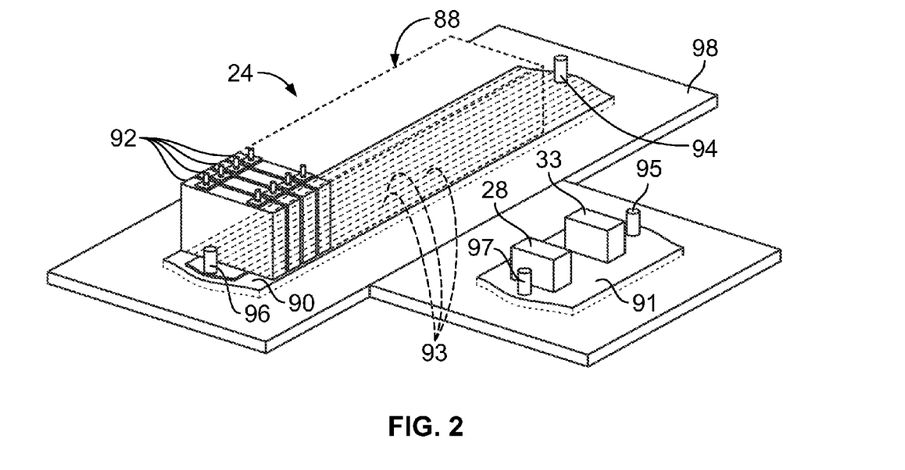
FIG. 2 is a perspective view of an example of a portion of a traction battery and thermal management system.

In one example, the battery cell array 88 may be mounted to the thermal plate 90 such that only one surface, of each of the battery cells 92, such as a bottom surface, is in contact with the thermal plate 90. The thermal plate 90 and individual battery cells 92 may transfer heat between one another to assist in managing the thermal conditioning of the battery cells 92 within the battery cell array 88 during vehicle operations. Uniform thermal fluid distribution and high heat transfer capability are two thermal plate 90 considerations for providing effective thermal management of the battery cells 92 within the battery cell arrays 88 and other surrounding components. Since heat transfers between thermal plate 90 and thermal fluid via conduction and convection, the surface area in a thermal fluid flow field is important for effective heat transfer, both for removing heat and for heating the battery cells 92 at cold temperatures. For example, charging and discharging the battery cells generates heat which may negatively impact performance and life of the battery cell array 88 if not removed. Alternatively, the thermal plate 90 may also provide heat to the battery cell array 88 when subjected to cold temperatures.

The thermal plate 90 may include one or more channels 93 and/or a cavity to distribute thermal fluid through the thermal plate 90. For example, the thermal plate 90 may include an inlet port 94 and an outlet port 96 that may be in communication with the channels 93 for providing and circulating the thermal fluid. Positioning of the inlet port 94 and outlet port 96 relative to the battery cell arrays 88 may vary. For example and as shown in FIG. 2, the inlet port 94 and outlet port 96 may be centrally positioned relative to the battery cell arrays 88. The inlet port 94 and outlet port 96 may also be positioned to the side of the battery cell arrays 88. Alternatively, the thermal plate 90 may define a cavity (not shown) in communication with the inlet port 94 and outlet port 96 for providing and circulating the thermal fluid. The thermal plate 91 may include an inlet port 95 and an outlet port 97 to deliver and remove thermal fluid. Optionally, a sheet of thermal interface material (not shown) may be applied to the thermal plate 90 and/or 91 below the battery cell array 88 and/or the DC/DC converter module 28 and BECM 33, respectively. The sheet of thermal interface material may enhance heat transfer between the battery cell array 88 and the thermal plate 90 by filling, for example, voids and/or air gaps between the battery cells 92 and the thermal plate 90. The thermal interface material may also provide electrical insulation between the battery cell array 88 and the thermal plate 90. A battery tray 98 may support the thermal plate 90, the thermal plate 91, the battery cell array 88, and other components. The battery tray 98 may include one or more recesses to receive thermal plates.

Different battery pack configurations may be available to address individual vehicle variables including packaging constraints and power requirements. The battery cell array 88 may be contained within a cover or housing (not shown) to protect and enclose the battery cell array 88 and other surrounding components, such as the DC/DC converter module 28 and the BECM 33. The battery cell array 88 may be positioned at several different locations including below a front seat, below a rear seat, or behind the rear seat of the vehicle, for example. However, it is contemplated the battery cell arrays 88 may be positioned at any suitable location in the vehicle 12.

A contact of the mating surfaces between a thermal plate and surfaces of the battery cells is a factor which may affect heat transfer within a battery thermal management system and particularly with regard to conduction between the thermal plate and the battery cells. The mating surfaces may be uneven due to surface tolerances, component irregularities, and/or debris which may result in gaps therebetween. Additionally, deformation of the battery cell array, such as bending and/or twisting, may result in battery cell to battery cell placement tolerances. Heat transfer relating to battery cell cooling and heating may be less efficient where gaps are present between the mating surfaces of the respective thermal plates and bottom surfaces of the battery cells. Eliminating these contact deficiencies and/or obtaining a flush contact between the surfaces may be desirable to provide for more enhanced heat transfer within the thermal management system. Further, previous examples of traction battery assemblies may include a thermal plate below a set of battery cell arrays. In this example, terminals of the battery cell arrays are vertically oriented relative to the thermal plate and the battery cell arrays may be spaced apart from one another. This example may require more components and as a result, more packaging space since the thermal plate is below the battery cell arrays instead of being disposed therebetween.

FIGS. 3A through 6 show another example of a portion of a traction battery assembly. In this example, a portion of a traction battery assembly 100 may include an exo-support structure having a pair of sub-structures 106. Each of the sub-structures 106 may include a pair of opposing endplates 108. An upper sidewall 110 and a lower sidewall 112 may span between each of the opposing endplates 108. A plurality of fasteners 114 may join the upper sidewalls 110 and the lower sidewalls 112 to their respective opposing endplates 108. In each of the sub-structures 106, the respective endplates 108, upper sidewalls 110, and lower sidewalls 112 may retain a battery cell array 120 therebetween. The pair of battery cell arrays 120 may include a plurality of battery cells 122. Each battery cell array 120 may define an inner face 126 and an outer face 128. A plurality of terminals 130 may extend from each of the outer faces 128 in a lateral orientation relative to the battery cells 122 instead of a vertical orientation of previous examples of traction battery assemblies described above.

The battery cell arrays 120 may be spaced apart from one another. The sub-structures 106 may orient and/or retain the battery cells 122 and may be sized to receive a thermal plate assembly between the battery cell arrays 120. The thermal plate assembly may include a thermal plate 136 and two thermal interface components 142. The thermal interface components 142 may be disposed on opposite sides of the thermal plate 136. The sub-structures 106 and the thermal plate assembly may be arranged with one another to define a sandwich formation. The thermal plate 136 may be in thermal communication with each of the battery cell arrays 120 to assist in managing thermal conditions of the battery cells 122. The thermal interface components 142 may enhance heat transfer between the battery cell arrays 120 and the thermal plate 136. For example, the thermal interface components 142 may fill in any voids or air gaps between the battery cells 122 and the thermal plate 136. The thermal interface components 142 may also provide electrical insulation between the battery cells 122 and the thermal plate 136. Examples of thermal interface components 142 may include a sheet of thermal interface material, a thermal interface paste, or a thermal interface adhesive.

Figures 3A, 3B:
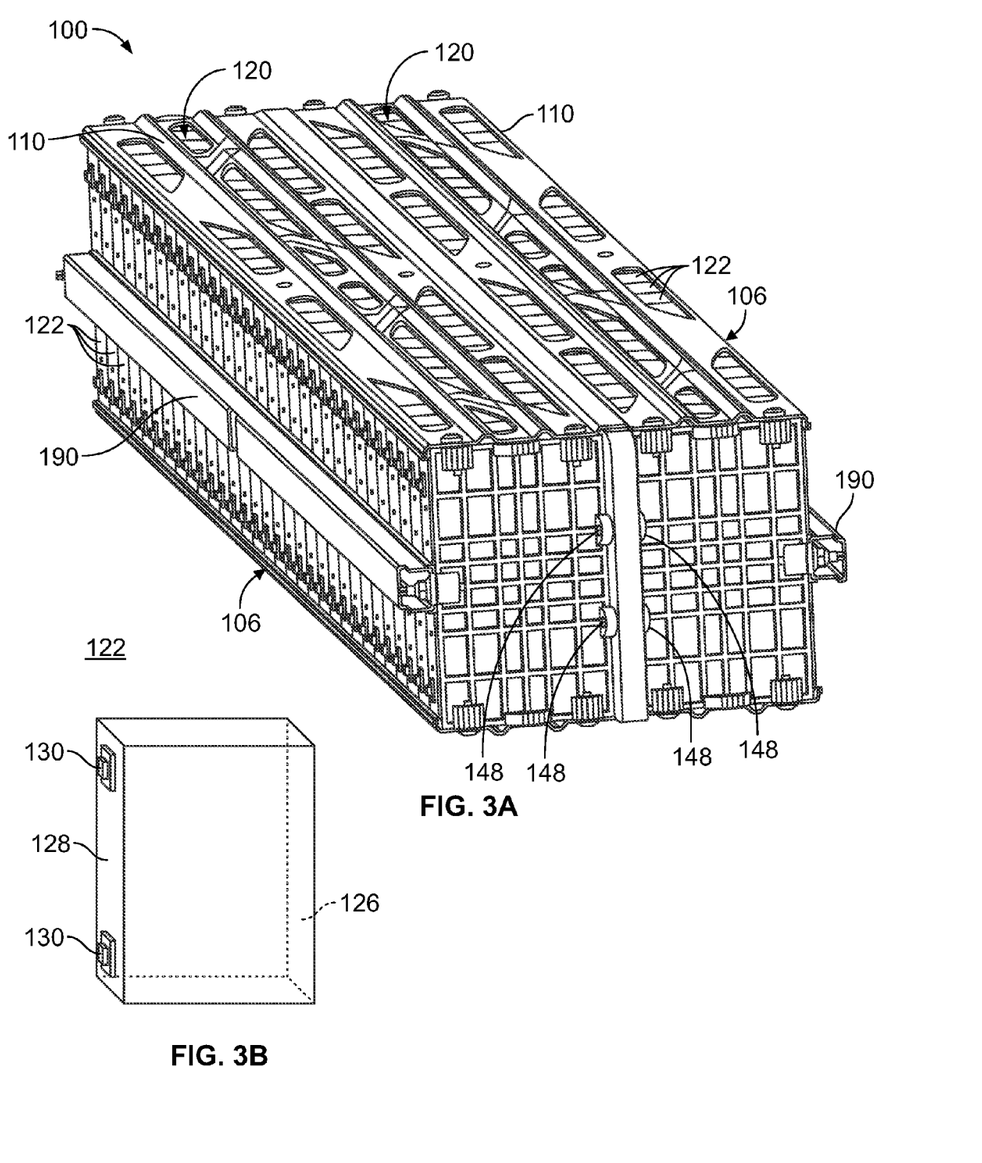
FIG. 3A is a perspective view of an example of a portion of a traction battery assembly having an exo-support structure for two battery cell arrays and a thermal plate assembly.
FIG. 3B is a perspective view of a battery cell of the two battery cell arrays of FIG. 3A.
Figure 5:
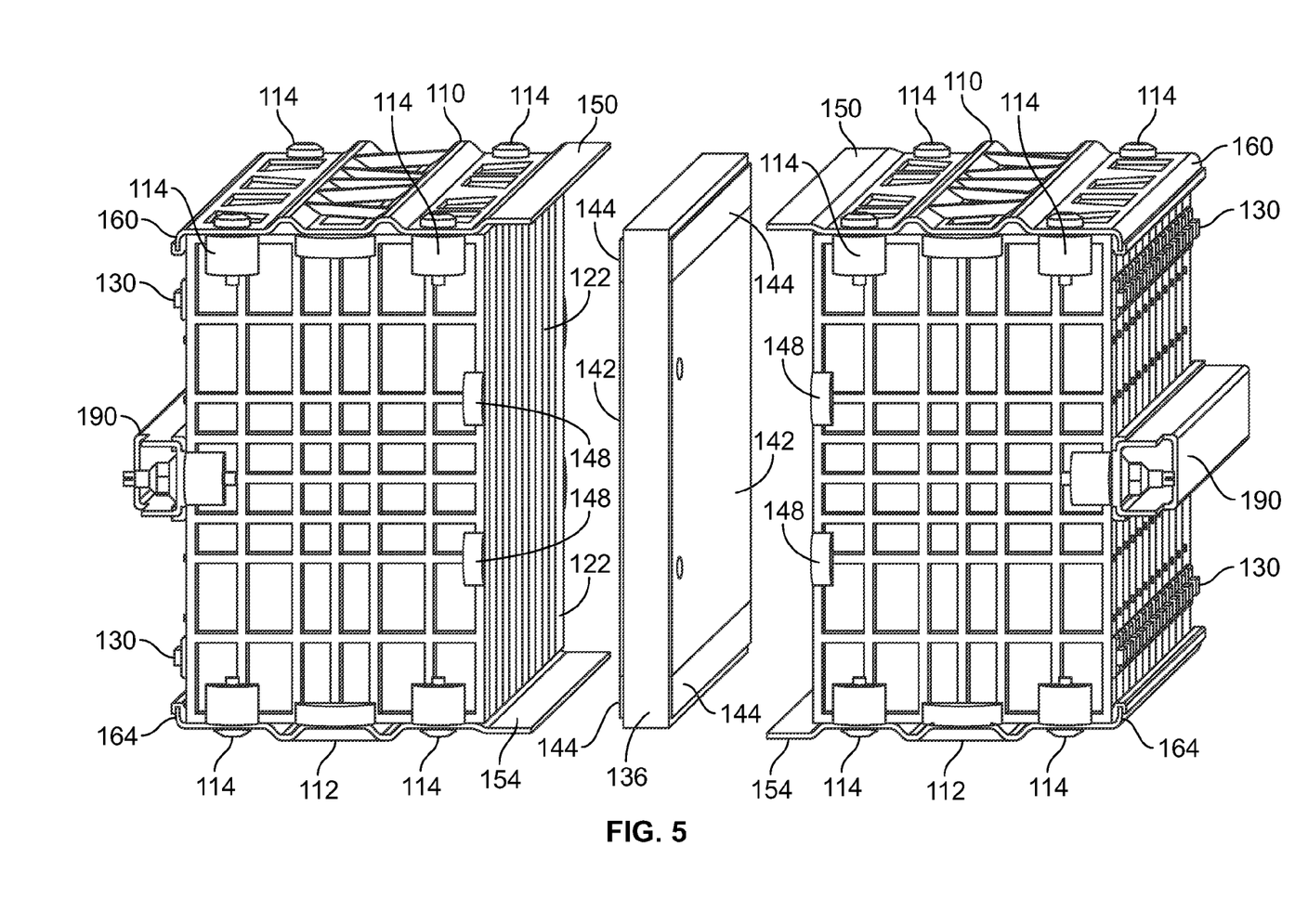
FIG. 5 is a partially exploded view of the portion of the traction battery assembly of FIG. 3A showing two substructures of the exo-support structure and the thermal plate assembly.

The exo-support structure may also include one or more bosses 148 on each of the opposing endplates 108. The bosses 148 may be arranged with corresponding apertures (not shown) of the thermal plate 136 to facilitate fastening thereto. One or more compression limiters 144 may extend from the thermal plate 136. The compression limiters 144 may be secured to the thermal plate 136 or the thermal plate 136 may define the compression limiters 144. The compression limiters 144 may be arranged with the battery cells 122 to assist in dictating an amount of compression force received by the thermal interface components 142 from the battery cells 122 or a distance of movement of the battery cells 122 when the sub-structures 106 are joined to one another.

Figure 4:
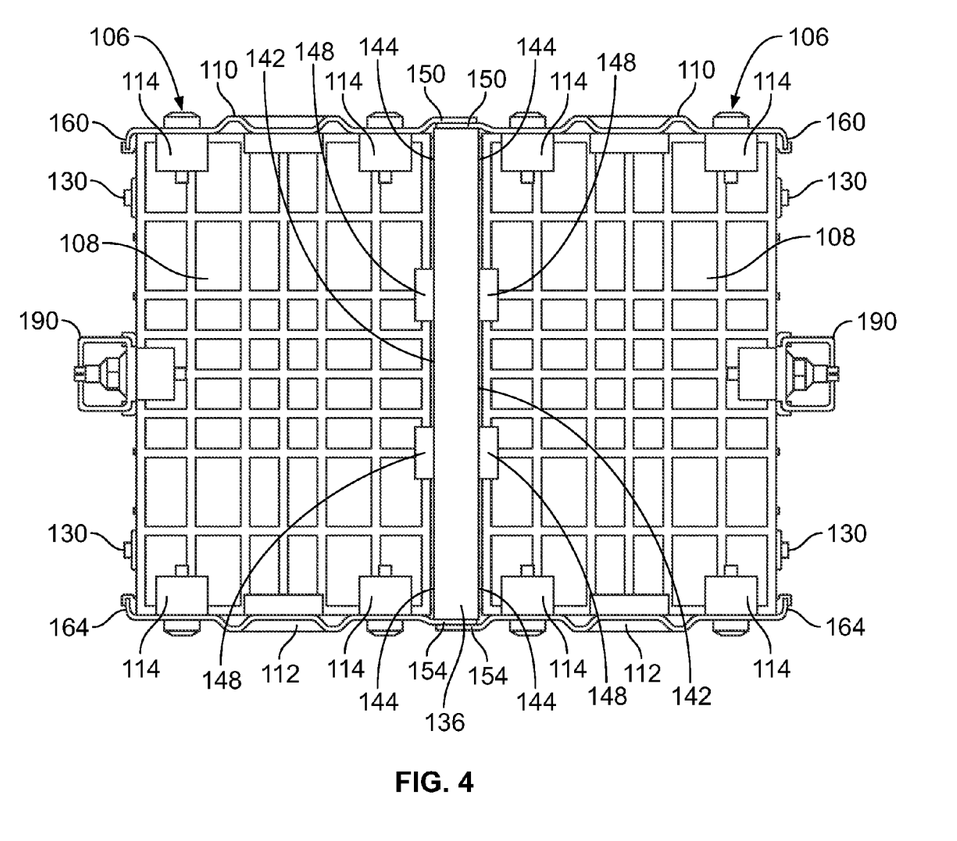
FIG. 4 is a front view of the portion of the traction battery assembly of FIG. 3A.
Figure 6:
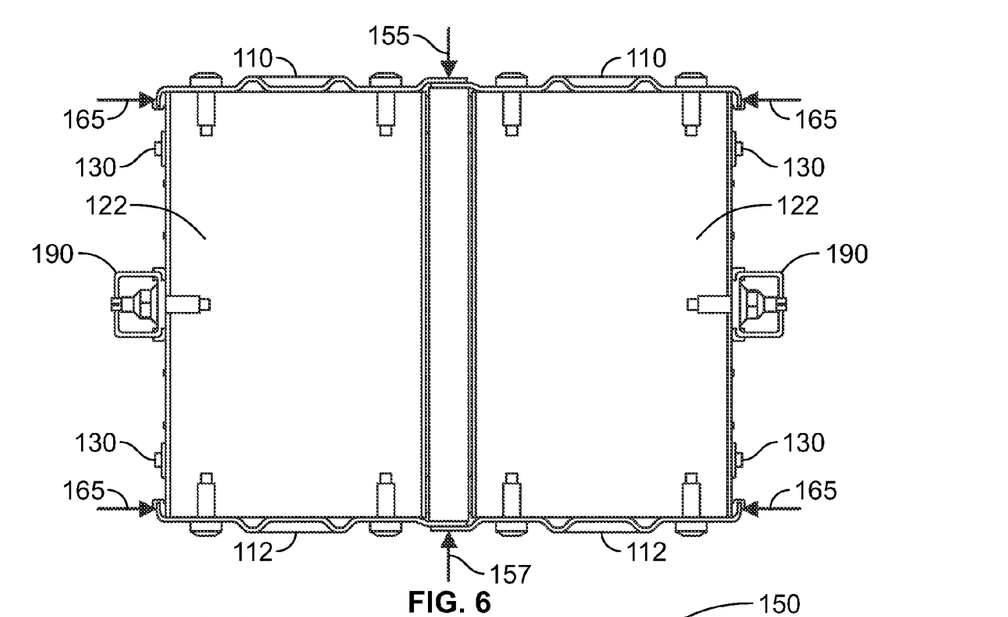
FIG. 6 is a front view of the portion of the traction battery assembly of FIG. 3A with portions removed to show internal components of the traction battery assembly.

For example, the sub-structures 106 may be joined to one another to assist in providing desired contact between the battery cells 122, the thermal interface components 142, and the thermal plate 136. The upper sidewalls 110 may each include an upper inner retention flange 150. The upper inner retention flanges 150 may extend from a portion of the respective upper sidewall 110 proximate the inner faces 126 of the battery cell arrays 120 toward the other sub-structure 106. The upper inner retention flanges 150 may contact and overlap one another to generate a force toward the thermal plate 136 as shown by force arrow 155. For example, the upper inner retention flanges 150 may be of a material having elastic characteristics to assist with the overlapping relationship of the upper inner retention flanges 150. The lower sidewalls 112 may each include a lower inner retention flange 154. The lower inner retention flanges 154 may extend from a portion of the respective lower sidewall 112 proximate the inner faces 126 of the battery cell arrays 120 toward the other sub-support structure 106. The lower inner retention flanges 154 may contact and overlap one another to generate a force toward the thermal plate 136 as shown by force arrow 157.

For example and as with the upper inner retention flanges 150, the lower inner retention flanges 154 may be of a material having elastic characteristics to assist with the overlapping relationship of the lower inner retention flanges 154. The forces generated by the upper inner retention flanges 150 and the lower inner retention flanges 154 may compress the thermal plate 136 therebetween. The upper inner retention flanges 150, the lower inner retention flanges 154, and the inner faces 126 of the battery cell arrays 120 may define a cavity therebetween. The sub-structures 106 may orient and/or retain the battery cells 122 such that the cavity may be sized to receive the thermal plate assembly. One of each of the upper inner retention flanges 150 and the lower inner retention flanges 154 may define a width which is equal to or less than a width of the thermal plate assembly to provide appropriate clearance relative to the opposing sub-structure 106 and contact between the thermal plate assembly and the battery cell arrays 120. In another example, one of each of the upper inner retention flanges 150 and the lower inner retention flanges 154 may define a width which is greater than the width of the thermal plate assembly. In this example, the other of the flanges may define a recessed pocket to receive upper inner retention flange 150 or lower inner retention flange 154 with the width greater than the width of the thermal plate assembly. Alternatively, the upper retention flanges 150 and the lower retention flanges 154 may have design clearances to one another and the thermal plate 136 to facilitate assembly of the sub-structures 106 and the thermal plate 136. For example, after locating the sub-structure 106 and the thermal plate 136 proximate to one another (as shown in FIG. 6), the forces 155 and 157 may be developed by an external tool or fixture to overcome the design clearances of the upper retention flanges 150 and the lower retention flanges 154 during a securing operation that retains the sub-structures 106 and the thermal plate assembly to one another.

The upper sidewalls 110 may each include an upper outer retention flange 160. The upper outer retention flanges 160 may extend from a portion of the respective upper sidewall 110 proximate the outer faces 128 of the of the battery cell arrays 120 toward the terminals 130. The upper outer retention flanges 160 may cover a portion of the outer faces 128. The lower sidewalls 112 may each include a lower outer retention flange 164. The lower outer retention flanges 164 may extend from a portion of the respective lower sidewall 112 proximate the outer faces 128 of the battery cell arrays 120 toward the terminals 130. The lower outer retention flanges 164 may cover a portion of the outer faces 128. The upper outer retention flanges 160 and the lower outer retention flanges 164 may be arranged with the battery cell arrays 120 to exert opposing forces in a lateral direction as shown by force arrows 165. For example, the upper outer retention flanges 160 and the lower outer retention flanges 164 may assist in compressing the battery cell arrays 120 against the thermal plate 136 and, if present, the thermal interface components 142.

Figure 7:
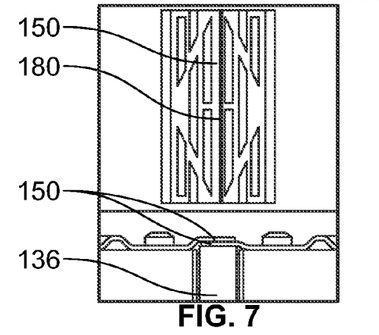
FIG. 7 is a plan view and a fragmentary cross-sectional view of an example of laser welded upper sidewalls of the portion of the traction battery assembly of FIG. 3A.
Figure 8:
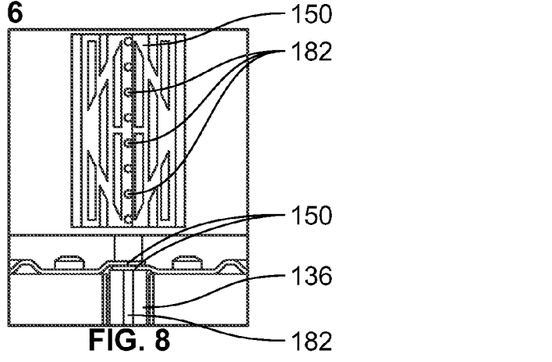
FIG. 8 is a plan view and a fragmentary cross-sectional view of an example of upper sidewalls of the portion of the traction battery assembly of FIG. 3A shown joined to one another via bolts.
Figure 9:
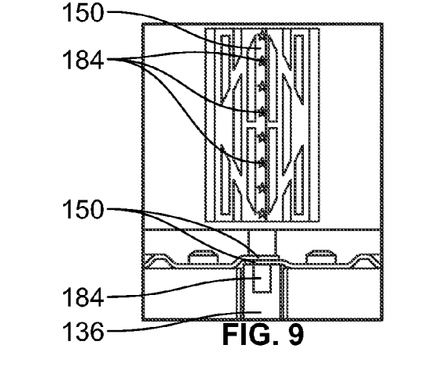
FIG. 9 is a plan view and a fragmentary cross-sectional view of an example of upper sidewalls of the portion of the traction battery assembly of FIG. 3A shown joined to one another via rivets.
Figure 10:
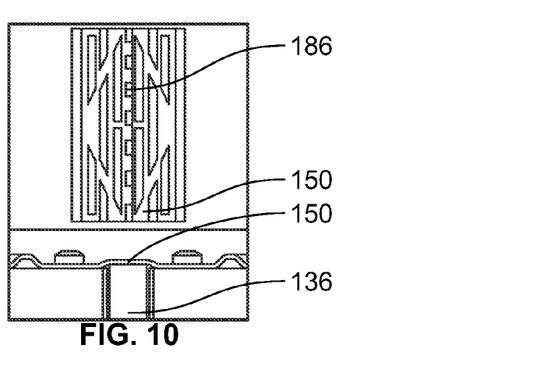
FIG. 10 is a plan view and a fragmentary cross-sectional view of an example of upper sidewalls of the portion of the traction battery assembly of FIG. 3A shown joined to one another via nested walls defined by the upper sidewalls.

While the overlapping relationship of the upper inner retention flanges 150 and the lower inner retention flanges 154 may join the sub-structures 106 and the thermal plate assembly without mechanical fasteners, the overlapping relationship may also provide for various fastening options if desired and as shown in FIGS. 7 through 10. FIGS. 7 through 10 show examples joining the upper inner retention flanges 150, however it is to be understood that the fastening options may be available for joining the lower inner retention flanges 154 as well. FIG. 7 shows an example in which the upper inner retention flanges 150 are laser welded together along a seam 180. Other examples of suitable welding options include seam welding and spot welding. A laser weld may provide a lower profile of the overlapping flanges 150 relative to the joining options shown in FIGS. 8 and 9. Further, a laser weld does not require receiving fasteners to be included within the thermal plate 136 which may interfere with coolant channels of the thermal plate 136. FIG. 8 shows an example in which the upper inner retention flanges 150 are joined by a plurality of bolts 182. The plurality of bolts 182 may provide benefits with regard to serviceability of the traction battery 100. For example, the bolts 182 are easier to remove when compared with the joining options shown in FIGS. 7 and 9. FIG. 9 shows an example in which the upper inner retention flanges 150 are joined by a plurality of rivets 184. The plurality of rivets 184 provide a lower profile of the overlapping upper inner retention flanges 150 and are not inserted into the thermal plate 136 as deep as when the bolts 182 are used to join the upper inner retention flanges 150. FIG. 10 shows an example in which the upper inner retention flanges 150 define a plurality of nested walls 186. The nested walls 186 provide a substantially flush relationship between the upper retention flanges 150, and in this example the upper retention flanges 150 have an interlocking relationship rather than an overlapping relationship and as result, have a lower profile than the joining options shown in FIGS. 7 through 9. The nested walls 186 may be joined to one another, for example, via a laser weld, bolts, or rivets. In another example, the upper retention flanges 150 and the lower retention flanges 154 may be adhesively bonded to one another.

Optionally, the sub-support structures 106 may each include a center bar 190. The center bar 190 may extend longitudinally along the outer faces 128 of the battery cell arrays 120. The center bar 190 may span between the respective endplates 108 to assist in longitudinally reinforcing the exo-support structure.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated.

While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a pair of spaced apart battery cell arrays;
   a pair of sub-structures to retain the arrays, each including opposing endplates, opposing upper and lower sidewalls secured to the endplates and each having a flange extending toward and overlapping with the respective flange of the other sub-structure to join the sub-structures without mechanical fastening; and
   a thermal plate assembly disposed between the overlapping flanges for a friction fit therewith.

2. The vehicle of claim 1, wherein the thermal plate assembly comprises at least one thermal interface component disposed on a side of a thermal plate, and in contact with a portion of at least one of the battery cell arrays.

3. The vehicle of claim 2, wherein the thermal plate assembly further comprises one or more compression limiters arranged with at least one of the thermal interface components to dictate an amount of compression the at least one of the thermal interface components receives from the adjacent battery cell array.

4. The vehicle of claim 1, wherein the upper and lower sidewalls further have another flange covering at least a portion of respective outer faces defined by the battery cell arrays, respectively, and wherein the another flanges are arranged with the battery cell arrays such that opposing lateral forces are applied to the thermal plate assembly.

5. The vehicle of claim 1, wherein the one of the overlapping flanges defines a width equal to or less than a width of the thermal plate assembly.

6. The vehicle of claim 1, wherein the overlapping flanges are laser welded, bolted, riveted, or adhesively bonded to one another.

7. A traction battery assembly comprising:
   first and second arrays of battery cells each having inner and outer faces, and terminals extending from the outer faces;
   an exo-support structure, including retention flanges, arranged to retain the arrays such that the flanges and inner faces define a cavity therebetween; and
   a thermal plate assembly disposed within the cavity for a friction fit between the retention flanges and in thermal communication with the arrays.

8. The assembly of claim 7, wherein the exo-support structure includes a pair of sub-structures on opposite sides of the thermal plate assembly, each sub-structure including upper and lower sidewalls having inner retention flanges of the retention flanges overlapping the respective upper or lower sidewall from the other sub-structure, and wherein the inner retention flanges are arranged with the thermal plate assembly to exert opposing vertical forces against the thermal plate assembly.

9. The assembly of claim 8, wherein the upper and lower sidewalls further have outer retention flanges of the retention flanges covering at least a portion of the outer faces of the arrays, and wherein the outer retention flanges are arranged with the arrays to exert opposing lateral forces against the thermal plate assembly.

10. The assembly of claim 9, wherein the exo-support structure further comprises a center bar extending longitudinally along the outer faces to longitudinally reinforce the exo-support structure.

11. The assembly of claim 7, wherein the thermal plate assembly includes a pair of thermal interface components, one of each disposed on either side of a thermal plate.

12. The assembly of claim 11, further comprising one or more compression limiters on each side of the thermal plate facing the arrays, and wherein the limiters are arranged with the battery cells to define an extent of the compression of the thermal interface components.

13. The assembly of claim 7, wherein the exo-support structure includes a pair of sub-structures on either side of the thermal plate assembly joined to one another without mechanical fasteners, each sub-structure including a plurality of vertical and lateral retention flanges of the retention flanges extending therefrom.

14. The assembly of claim 13, wherein the thermal plate assembly includes a thermal plate and a thermal interface component disposed on both sides of the thermal plate, and wherein the vertical and lateral retention flanges are arranged with the arrays and thermal plate assembly such that opposing forces are exerted toward the thermal plate to compress the thermal interface components between the thermal plate and respective array.

15. A traction battery assembly comprising:
first and second arrays of battery cells having terminals extending from outer side faces of the arrays;
a thermal plate assembly disposed between the arrays and in thermal communication therewith; and
an exo-support structure configured to support the arrays and including
a pair of upper sidewalls each including an upper flange extending above the thermal plate assembly and overlapping one another,
a pair of lower sidewalls each including a lower flange extending below the thermal plate assembly and overlapping one another, and
pairs of opposing endplates arranged with the respective sidewalls to retain the arrays therebetween,
wherein the flanges are arranged for compression against the thermal plate assembly such that the arrays are compressed against the opposite sides of the thermal plate assembly.

16. The assembly of claim 15, wherein the thermal plate assembly comprises:
a thermal plate; and
a pair of thermal interface components disposed on opposite sides of the thermal plate and arranged with the exo-support structure to contact inner faces of the arrays.

17. The assembly of claim 16, wherein the thermal plate assembly further comprises one or more compression limiters located proximate the thermal interface components and arranged with the exo-support structure to dictate an amount of compression force applied from the arrays to the thermal interface components.

18. The assembly of claim 15, wherein each of the sidewalls further includes outer flanges covering at least a portion of the respective outer side faces, and wherein the outer flanges are arranged with the thermal plate assembly such that the arrays are compressed therebetween.

19. The assembly of claim 15, wherein one of each of the overlapping upper and lower flanges defines a width equal to or less than a width of the thermal plate assembly.

20. The assembly of claim 19, wherein the overlapping upper and lower flanges are laser welded, bolted, or riveted to one another.

* * * * *